UNITED STATES PATENT OFFICE.

HARRY WILLIAMS CHARLTON, OF NEW YORK, N. Y.

POTASH-RECLAIMING.

1,341,110.  Specification of Letters Patent.  Patented May 25, 1920.

No Drawing.  Application filed August 18, 1919. Serial No. 318,122.

*To all whom it may concern:*

Be it known that I, HARRY WILLIAMS CHARLTON, a citizen of Canada, residing at New York, in the county of New York and State of New York, have invented a new and useful Improvement in Potash-Reclaiming, of which the following is a description.

My invention relates to a method of liberating potassium from greensand, or glauconite, in which a comparatively valueless by-product from another industry is employed as the active reagent.

It has for its object the liberation and recovery of potassium compounds in a simpler manner and at less cost than by the methods already known, by employing as a liberating reagent, a well known material that is produced in tremendous quantities and for which a very limited market exists.

As an example of this process I may intimately mix greensand with from 2 to 40% of its weight of ferrous chlorid and heat slowly up to a temperature of from 300 to 900° C. either alone or in the presence of steam. By the interaction between the two materials potassium chlorid is formed, and $Fe_3O_4$ results as a decomposition product of the ferrous chlorid. The operation may be carried out in any of the well known types of furnaces. The duration of the treatment is from 20 minutes to 2 hours. If the potassium salt is to be separated the mass is lixivated. If not, it is sold as a fertilizer without any further treatment.

Of course, a preliminary grinding of the greensand would aid the liberation, but such a proceeding is out of the question in a process of this nature where economy is of paramount importance.

The greensand and the ferrous chlorid may be mixed in any manner, but I have found that the simplest and best way is to dissolve the ferrous chlorid in a minimum of water and moisten the greensand with it. Greensand itself possesses remarkable powers of being wetted by and holding water. This property is of great value in this method of mixing.

As is well known ferrous chlorid is a by-product in the steel industry that at the present time finds no ready market owing to the tremendous tonnage produced each year. It is a result of the pickling process. Being much less volatile than the ferric salt and yet capable of rapid decomposition, it enters easily into reaction with greensand and is completely decomposed so that none is left in the residue. This enables the potassium chlorid to be extracted free from iron chlorids, or if the mass is used directly as a fertilizer none of the objectionable chlorids remain. The resulting insoluble residue is made up largely of various oxids of iron and silica and being of a very dark red color may be employed as a pigment for paints, cements, etc. As it contains a very respectable amount of iron it may replace iron ores in blast furnaces, etc.

The reaction may be hastened, if so desired, by passing steam through the mass. As ferrous chlorid is known to decompose in this manner,

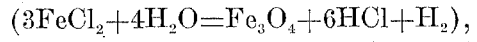
$$(3FeCl_2 + 4H_2O = Fe_3O_4 + 6HCl + H_2),$$

the reactive power is equivalent to that of hydrochloric acid with the added advantage that the chemical combination takes place at temperatures above the boiling point of hydrochloric acid.

We are aware that a similar reaction takes place when ferrous sulfate is heated with greensand and it is found that the reaction is hastened if a mixture of these is employed.

In this case the greensand is simultaneously subjected to the action of both acids in a nascent state at the point at which decomposition of their iron salts begins.

Another interesting feature is that after the greensand has been treated with either $FeSO_4$ or $FeCl_2$ or a mixture of the two, it is possible to aid the extraction by digesting with a small amount of acids or alkalis. When the potassium is liberated as potassium sulfate, the lime digestion produces a lot of potassium hydrate.

One great advantage in employing either ferrous sulfate or ferrous chlorid as a liberating reagent, is that both these result as by-products in the steel industry and if desired may be obtained in solution. All that is then necessary is to saturate the greensand with them, and then heat below a sintering temperature.

It is obvious that those skilled in the art may vary the details of the process as well as the propositions set forth, without departing from the spirit of the invention, and therefore, I do not wish to be limited to the above disclosures except as may be required by the claims.

I claim:—

1. A process of liberating potassium which comprises heating greensand with ferrous chlorid; substantially as described.

2. A process of liberating potassium which comprises heating greensand with ferrous chlorid below a sintering temperature; substantially as described.

3. A process of liberating potassium which comprises heating greensand with ferrous chlorid and dissolving out the potassium chlorid formed; substantially as described.

4. A process of liberating potassium which comprises heating greensand with ferrous chlorid and sulfate and dissolving out the soluble potassium compounds; substantially as described.

HARRY WILLIAMS CHARLTON.